July 19, 1966 R. W. BOND ETAL Re. 26,064

AUTOPILOT

Original Filed Aug. 28, 1958 8 Sheets-Sheet 1

INVENTORS.
ROBERT W. BOND
HAROLD G. MARKEY
JOHN H. LADD
BY ROY L. ROBERTS, Jr.
GEORGE R. KELLER

Allan Rothenberg
ATTORNEY

INVENTORS.
ROBERT W. BOND
HAROLD G. MARKEY
JOHN H. LADD
BY ROY L. ROBERTS, Jr.
GEORGE R. KELLER
Allan Rothenberg
ATTORNEY INVENTORS,
ROBERT W. BOND
HAROLD G. MARKEY
JOHN H. LADD
BY ROY L. ROBERTS, Jr.
GEORGE R. KELLER
Allan Rothenberg
ATTORNEY

AUTOPILOT

Original Filed Aug. 28, 1958 8 Sheets-Sheet 4

INVENTORS.
ROBERT W. BOND
HAROLD G. MARKEY
JOHN H. LADD
BY ROY L. ROBERTS, Jr.
GEORGE R. KELLER
Allan Rothenberg
ATTORNEY

AUTOPILOT

Original Filed Aug. 28, 1958 8 Sheets-Sheet 5

INVENTORS.
ROBERT W. BOND
HAROLD G. MARKEY
JOHN H. LADD
BY ROY L. ROBERTS, Jr.
GEORGE R. KELLER
Allan Rothenberg
ATTORNEY

AUTOPILOT

Original Filed Aug. 28, 1958 8 Sheets-Sheet 6

INVENTORS.
ROBERT W. BOND
HAROLD G. MARKEY
JOHN H. LADD
ROY L. ROBERTS, Jr.
GEORGE R. KELLER
BY Allen Rothenberg
ATTORNEY

AUTOPILOT

Original Filed Aug. 28, 1958 8 Sheets-Sheet 7

INVENTORS.
ROBERT W. BOND
HAROLD G. MARKEY
JOHN H. LADD
BY ROY L. ROBERTS, Jr.
GEORGE R. KELLER
Allan Rothenberg

AUTOPILOT

Original Filed Aug. 28, 1958 8 Sheets-Sheet 8

INVENTORS.
ROBERT W. BOND
HAROLD G. MARKEY
JOHN H. LADD
BY ROY L. ROBERTS, Jr.
GEORGE R. KELLER
Allan Rothenberg
ATTORNEY United States Patent Office Re. 26,064
Reissued July 19, 1966

26,064
AUTOPILOT

Robert W. Bond, Whittier, Harold G. Markey, San Jose, John H. Ladd, Downey, Roy L. Roberts, Jr., Fullerton, and George R. Keller, Whittier, Calif., by North American Aviation, Inc., a corporation of Delaware Original No. 3,094,299, dated June 18, 1963, Ser. No. 757,852, Aug. 28, 1958. Application for reissue Feb. 2, 1966, Ser. No. 532,504
7 Claims. (Cl. 244—77)

Matter enclosed in heavy brackets [ ] appears in the original patent but forms no part of this reissue specification; matter printed in italics indicates the additions made by reissue.

This invention relates to the control of aircraft and particularly concerns an autopilot for controlling an aircraft throughout any or all portions of a complete flight program from take-off to landing and including climb, cruise, maneuvers and descent.

In the development of aircraft and in particular the development of high speed unmanned aircraft, a period of test flights is required for determination of the optimum characteristics of a final design. In addition, test flights of the operational aircraft are required in order to further improve reliability of the aircraft and test its mission capabilities. For these test flights and for the operational flights themselves it is necessary to control the aircraft throughout a large number of widely varying flight programs and individually different phases thereof. Thus, an aircraft autopilot may be required for each of a number of different flight programs. However, it is desirable during the development and testing of such an aircraft that the autopilot itself be subjected to the similar developmental analysis and testing as uilized in conjunction with the particular aircraft. For this reason it is desirable to provide in a single autopilot all of the necessary control functions which may at one time or another be required for control of the aircraft throughout developmental test flights, operational test flights and the operational flights themselves.

Accordingly, it is an object of this invention to provide an autopilot for complete control of an aircraft during all phases of any or all of a number of different types of flight programs.

The autopilot of this invention is designed for flexibility of use in its application to various aircraft test flights and operational flights. Flexibility of control from either the remote pilot, ground radar and computer, or an autonavigator is also provided. For flexibility of application to different flight programs and the different phases thereof, there are provided appropriate control modes to accomplish automatic take-off, climb, various conditions of cruise and other maneuvers, descent, automatic landing and ground steering. For flexibility of control of the autopilot, the autopilot contains as its nucleus a simpler autopilot system which is adapted for use in conjunction with external radio control or control from an internal autonavigator to achieve complete guidance and control of a strategic or tactical operational aircraft.

In order to obtain a high degree of reliability, simple basic modes of both lateral and longitudinal control are included in the autopilot to facilitate manual control of the aircraft. The manual control modes are arranged to be separable from the automatic control modes. Consequently, if the pilot controlling from a remote point, such as a chase plane or ground station, prefers to retain direct control of the aircraft or, in the case of malfunction of an automatic mode, the manual modes are available. It is to be noted that the manual modes in the disclosed embodiment do not revert to "stick and pedal" control but are specifically pitch angle and bank angle control.

In accordance with a disclosed embodiment of the invention, the autopilot is arranged to provide as its basic function the dynamic stabilization and reduction of effects of random disturbances upon the aircraft. This function is achieved by stabilizing means such as a number of rate gyros on the aircraft which feed to the aerodynamic control surfaces signals indicative of the rate of change of aircraft orientation.

The second function of the autopilot is to maintain correct orientation of the air frame at all times. Since the path in space followed by the aircraft depends primarily upon its orientation, this function is of particular significance. Angular position sensing devices such as a vertical gyro for pitch and roll and a direction gyro for yaw are therefore provided to generate signals contributing to the controlled operation of the aerodynamic control surfaces.

A third function of the autopilot is to maintain certain flight conditions. These conditions may be flight parameters such as indicated air speed, Mach number, altitude or heading at any time during flight. Additionally, these conditions may include deviation of the aircraft from a selected path in space. The autopilot disclosed includes a plurality of condition or reference servos for generating signals indicative of air speed error, Mach number error, altitude error or heading error. Control signals for pitch angle and turn angle are also provided to the autopilot in order to control the aircraft along a desired course in space. Additionally, control modes peculiar to landing and take-off and other flight phases are also provided. Means are provided for selecting a desired longitudinal (pitch) control mode and a desired lateral (roll or yaw) control mode and feeding the signals generated in such modes, together with the stabilizing and orientation signals, to the appropriate control surfaces.

It is an object of this invention to provide an aircraft autopilot having a wide selection of control modes.

A further object of this invention is to provide an autopilot having one or more improved longitudinal control modes.

Another object is to provide an autopilot having one or more improved lateral control modes.

Still another object of this invention is to provide an autopilot having a plurality of available longitudinal and lateral control modes and having therein provision for selecting a desired combination of one lateral mode and one longitudinal mode.

These and other objects of this invention will become apparent from the following description taken in connection with the accompanying drawings, in which FIG. 1 illustrates an aircraft for which the described embodiment of the autopilot of this invention is particularly adapted;

Figure 9:
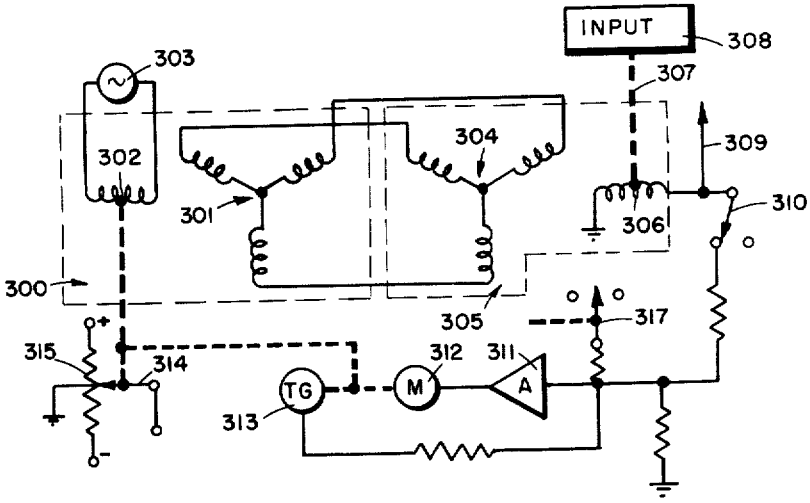

And FIG. 9 shows further details of an exemplary instrument reference servo.

In the drawings like reference numerals refer to like parts.

Figure 1:
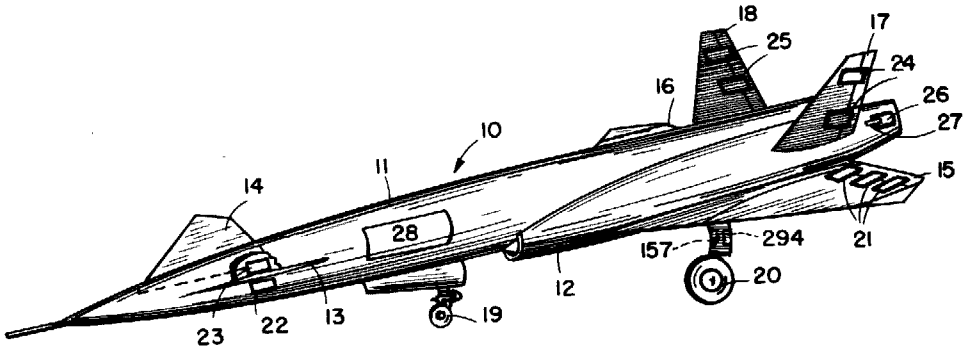

As illustrated in FIG. 1, an aircraft 10 in which the disclosed autopilot is to be carried and which is to be controlled by the autopilot comprises a fuselage 11, a pair of engines 12 (only one of which is shown), port and starboard trimmers or auxiliary pitch control surfaces 13, 14, port and starboard main pitch and roll control surfaces or elevons 15, 16 and a pair of yaw control surfaces or rudders 17, 18. A retractable tricycle landing gear including a nose wheel 19 and a pair of rear wheels 20 (only one of which is illustrated) are carried in conventional fashion from the fuselage. In the canard configuration shown, the main wing is aft of the body and carries at its trailing edge the elevons 15 and 16 which are each actuated by servos 21. The elevons 15, 16 will be actuated equally in unison for pitch control and differentially for roll control. Pitch and roll control by the elevons may be effected simultaneously. A forward auxiliary wing entirely constitutes the displaceable trimmers 13 and 14 hinged to the fuselage to be actuated in unison and equally by servos 22 and 23, respectively. The rudders 17 and 18 are actuated equally and in unison by servos 24 and 25, respectively. It is to be noted that in the configuration shown the longitudinal axis of the fuselage and the wings are displaced in pitch from the thrust axis of the engines 12 whereby the vehicle will normally fly with its fuselage in a pitched-up attitude.

Roll control is achieved through differential operation of the elevons. Simultaneously with roll control, rapid pitch control is achieved through additive control of the same elevons. Slow pitch control for the primary purpose of maintaining trim condition of the aircraft during variations of both the center of gravity and the aerodynamic center is accomplished through displacement of the forward trimmers 13, 14. Yaw control is achieved through the rudders. In certain modes speed control is accomplished automatically by means of pitch control through the elevons but in other modes is accomplished by control of engine thrust via the throttles. Within the concept of the disclosed invention there is contemplated alternative or additional speed control via control of conventional glide brakes 26 operated by servos 27. It is further contemplated that during ground runs yaw control by the rudders will be augmented by differential action of conventional wheel brakes (not shown). All of the autopilot including its electronics, various instruments and controls, except for the servos and certain relay switches, may be mounted in the autopilot rack 28 suitably supported within the fuselage 11. The autopilot sensing devices, all of which may be conventional instruments well-known to those skilled in the art and commercially available, include a pitch rate gyro, a roll rate gyro, a yaw rate gyro, a vertical gyro, a directional gyro, an indicated air speed instrument, a Mach number instrument, a pressure altimeter, a radar altimeter and a normal accelerometer, all of which will be carried and mounted in the rack 28.

GENERAL FUNCTIONS

Figure 2:
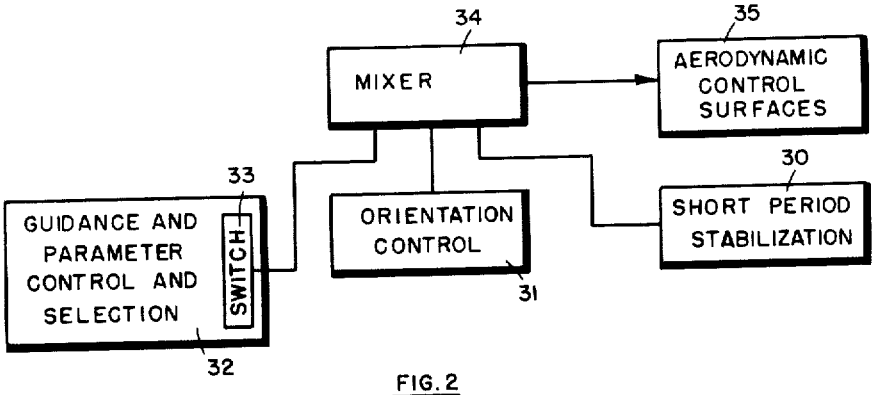
FIG. 2 illustrates the broad functional arrangement of the autopilot.

A basic functional diagram of the autopilot is illustrated in FIG. 2 wherein the short-period stabilization in the form of roll, pitch and yaw rate signals is illustrated as provided from the rate instrumentation comprising rate gyros 30. Maintenance of orientation is provided by attitude signals from orientation instruments such as a pair of free gyros 31. Maintenance of a selected flight condition is derived as a selected signal from instrumentation 32 which feeds to a switch 33 therein a number of flight condition control signals in the form of a difference between a particular aircraft flight parameter and a selected value thereof or as a space path control signal. The signals from the instrumentation arrangements 30, 31 and 32 are fed through a mixer 34 to effect the stabilization and selected control of the various aerodynamic control surfaces 35 in accordance with a particularly desired controlling mode. As the basic function of the autopilot is short-period stabilization, this is provided by the instrumentation 30 as a distinctly separable function. By means of this function the dynamic behavior of the air frame is not only greatly improved but is rendered more easily amenable to the various other modes of control selectively derived through the switching apparatus 33.

The function of maintaining correct orientation or attitude, which may under some flight conditions be eliminated, is accomplished by attitude feedback from the two free gyros 31 into the appropriate control surfaces.

The functions of maintaining certain flight conditions such as a selected flight parameter or a selected flight path are achieved by applying from instrumentation 32 and the switching 33 thereof a proper function of the error in the selected parameter or deviation from selected path as an attitude command signal to the basic portion of the autopilot. In this manner the control equations for these modes are made relatively independent of variations in most of the aerodynamic coefficients. Two of the modes, vertical and lateral deviation control, require transmission of functions of deviation from the design path (as measured by radar or an autonavigator) as attitude command signals to the autopilot.

LONGITUDINAL MODE FUNCTIONS

Figure 3:
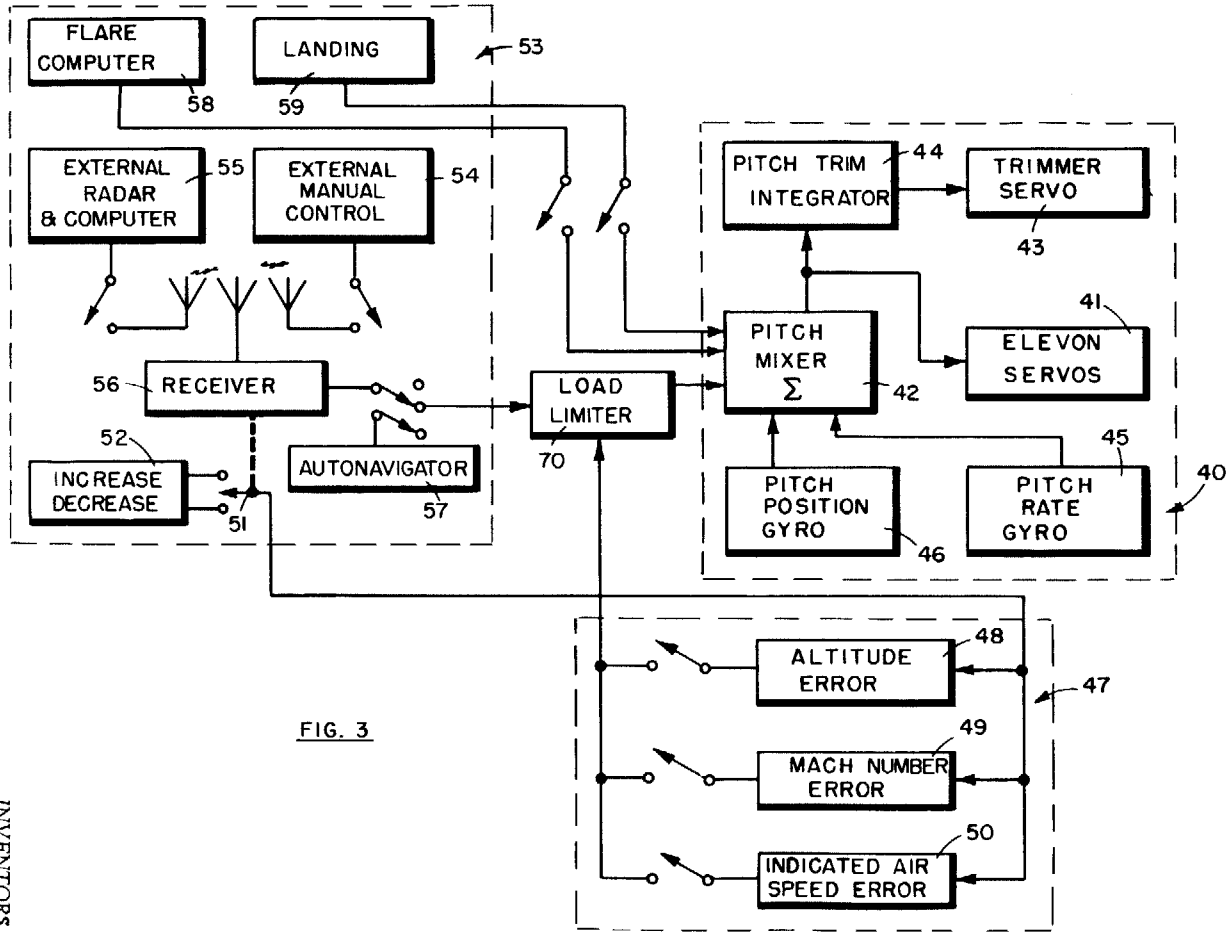
FIG. 3 is a functional diagram of the longitudinal modes of control.

A more detailed functional diagram of the six longitudinal control modes as illustrated in FIG. 3 comprises a first group of elements indicated in the dotted box 40 which achieves the functions of short-period stabilization and maintenance of orientation. The group of elements indicated in dotted box 40 as the nucleus of the autopilot includes the elevon servos 41 operated for pitch control in response to the output of pitch mixer 42 and the trimmer servo 43 operated via pitch trimmer integrator 44 in accordance with the integral of the elevon deflection control signal from the pitch mixer 42. With this arrangement the trimmer servo 43 will cause the trimmers 13, 14 of FIG. 1 to acquire a proper trim position and thus allow the elevons to maintain their trim position at or about a condition of zero deflection during steady flight. Thus, the elevons will normally be readily available to effect rapid changes of aircraft pitch attitude. The output of the pitch mixer 42 is the sum of a plurality of inputs thereto of which several may be simultaneously applied and others alternatively applied. The signal from pitch rate gyro 45 is at all times applied as one of the inputs to the pitch mixer for purposes of pitch stabilization. The pitch attitude of the aircraft in the form of a pitch position signal from a vertical gyro 46 may also be applied at all times to the pitch mixer to maintain pitch orientation or to provide a pitch orientation reference for comparison with pitch control signals derived in other longitudinal control modes.

A third function, that of maintaining a selected flight condition such as a specified one of the selected flight parameter values, is provided by the instrumentation grouped within the dotted box 47. This instrumentation includes an altitude error generator 48 which will provide as its output an altitude error control signal indicative of the difference between the altitude of the aircraft and a selected value thereof. There is also provided a Mach number error generator 49 which generates a Mach error control signal indicative of the difference between Mach number of the aircraft and a selected value thereof. The third instrument in this group is an indicated air speed error generator 50 which provides as its output an air speed error control signal indicative of the difference between the indicated air speed of the aircraft and a selected value thereof.

In response to a commanded reference variation which operates a switch 51, an increase-decrease generator 52 will feed to the instruments 48, 49 and 50 a signal which effects a relatively slow change in the reference provided by these instruments and will thus control the value of the selected parameter which is to be maintained.

The elements illustrated as grouped within the dotted box 53 may be interpreted as collectively maintaining a selected flight condition by effecting guidance of the aircraft along a selected space path. These components may comprise external sources of control signals from a remote pilot 54 (as in a chase plane) or from external radar and computing apparatus 55 at a ground station. The external control signals may be selectively and alternatively transmitted via radio to a receiver 56 (mounted in the aircraft) which feeds the received control signals to the pitch mixer and which may also receive and feed to the autopilot various mode selection signals which effect the operation of the several switches schematically illustrated in FIG. 3. The receiver also controls the switch 51 of the increase-decrease generator 52.

In those situations where the aircraft is to carry an autonavigator and computer 57 the latter may be used alternatively to or in conjunction with the externally controlled receiver in order to provide the necessary space path guidance and mode selection signals as a programmed or computed function of time or distance travelled. It is to be understood that the particular details of the source of the guidance and mode selection signals form no part of this invention since these may be obtained by conventional apparatus well-known to those skilled in the art.

Also included in the group 53 of space path control elements and their components are a flare computer 58 and a landing signal generator 59 carried by the aircraft and comprising a part of the autopilot. The flare computer 58 may be of the type more particularly described in application Serial No. 595,330, entitled Automatic Landing System, by Robert W. Bond and filed July 2, 1956, now Patent No. 3,031,662. Briefly, in response to control from the flare computer the pitch angle of the aircraft is controlled to provide a proper descent and landing. In this mode the pitch angle is controlled as a function of the difference between altitude and rate of change of altitude as measured by the radar altimeter of the flare computer 58. Thus, the aircraft sinking rate is reduced to a low value at touchdown in an exponential function of time.

The landing control generator 59 is armed to select this particular mode by the automatic operation of a switch controlled by the landing gear. This landing signal causes the autopilot to effect decrease of the aircraft pitch angle to insure ground contact of the nose wheel.

The external pitch angle control signals and the parameter error control signals from instruments 48, 49 and 50 are all fed to the pitch mixer 42 through a load limiter 70 which acts to prevent excessive wing loads by modifying as necessary all pitch angle command signals except those from the flare computer 58 and the landing generator 59. This load limiter is designed to have little or no effect upon the autopilot unless the design limit of the load factor is approached. As this occurs the load limiter limits the maximum rate of change of the pitch angle command signal as a function of acceleration sensed by a normal accelerometer which comprises part of the load limiter. In this manner adequate protection against excessive wing loads is prevented without undue restriction of maneuverability during critical flight conditions. Detailed description of the structure and function of the load limiter 70 is found in application Serial No. 460,284, entitled Limiting Device for Aircraft Wing Load, by Robert W. Bond et al., filed October 5, 1954, now Patent No. 2,866,933.

While not illustrated in FIG. 3, it is to be noted that the rudder command signals described hereinafter are coupled differentially to the elevons to thereby greatly reduce the effect of rolling moment due to rudder deflection. Thus, a considerable reduction of the magnitude of transients resulting from various disturbances is provided. This particular coupling may not be required if the disclosed autopilot is utilized in aircraft of configuration other than that illustrated in FIG. 1.

Thus, for longitudinal control there are provided six alternatively selectable control modes as follows. Mode 1, manual pitch angle control in the form of a proportional signal from the receiver or autonavigator. Mode 2, indicated air speed control in the form of an error signal from indicated air speed error generator 50. Mode 3, Mach number control in the form of an error signal from Mach number error generator 49. Mode 4, altitude control in the form of an error signal from altitude error generator 48. Mode 5, vertical deviation control similar to mode 1 and in the form of a pitch angle control signal. Mode 6, landing flare control in the form of a pitch angle control signal from the flare computer 58.

In all of the modes of longitudinal control the elevons are deflected in the same direction and comprise the primary sources of control. To avoid limited elevon deflections due to large hinge loads the autopilot is arranged to cause the elevons to be normally operated near the center position thereof. This condition is accomplished by means of the pitch trim integrator which achieves deflection of the trimmer at a rate proportional to the average displacement of the elevons whereby the actual trimmer displacement is proportional to the integral of the elevon displacement. In this manner, the trimmer assumes the correct trim position such as to allow the elevons to operate at or near center position during steady flight.

The primary source of stabilizing signal for longitudinal control is the pitch rate gyro 45. Pitch rate stabilization greatly increases the damping of the aircraft short period mode of oscillation and at the same time makes possible the stabilization of all of the modes of longitudinal control since pitch rate control is provided at all times.

The vertical gyro 46 provides the pitch angle signal necessary to control the pitch angle of the aircraft. In the manual modes of longitudinal control the pitch angle is controlled directly by the pitch command signal from the radio receiver or autonavigator. In each automatic control mode pitch angle is controlled by the appropriate error signal to achieve the desired flight parameter.

LATERAL MODE FUNCTIONS

In the lateral modes of control (FIG. 4) the aircraft will normally be controlled by bank turns except during ground runs when flat turn control is provided. However, flat turn control is available during flight if desired for certain test purposes.

In bank turn control the rolling rate of the aircraft is so controlled by differential operation of the elevons that the bank angle, as measured by the roll position output of the vertical gyro, is proportional to the bank angle command. A given bank angle will cause a given rate of turn for the disclosed aircraft configuration. During bank turns the elevon servos 41 are controlled in accordance with the output of the roll mixer 71 which has a bank angle input from the vertical gyro 46 and a roll rate input from roll rate gyro 72. The rudder servos 73 are controlled in response to the output of the yaw mixer 74 which has an input for purposes of yaw rate control from the yaw rae gyro 75. Thus, the rate signal fed into the elevons from the roll rate gyro and into the rudders from the yaw rate gyro greatly improves stability of the aircraft.

Flat turns in response to a turn control signal applied to the yaw mixer 74 and to the rudder servos 73 are utilized for taxiing or ground runs during take-off and landing. Flat turn control is also available during flight after take-off and during landing approach. Flat turns are obtained by displacement of the rudders to achieve the desired yaw rate while the bank angle is maintained substantially zero by elevon stabilization from the vertical gyro and roll rate gyro.

It is to be noted that the output of the yaw mixer 74, the rudder command signal, is at all times applied differentially to the elevons through roll mixer 71 to greatly reduce the large rolling moment caused by rudder deflection of an aircraft having the configuration illustrated in FIG. 1. This feature effects reduction of the magnitude of rolling transients resulting from rudder deflections and further improves stability.

Figure 4:
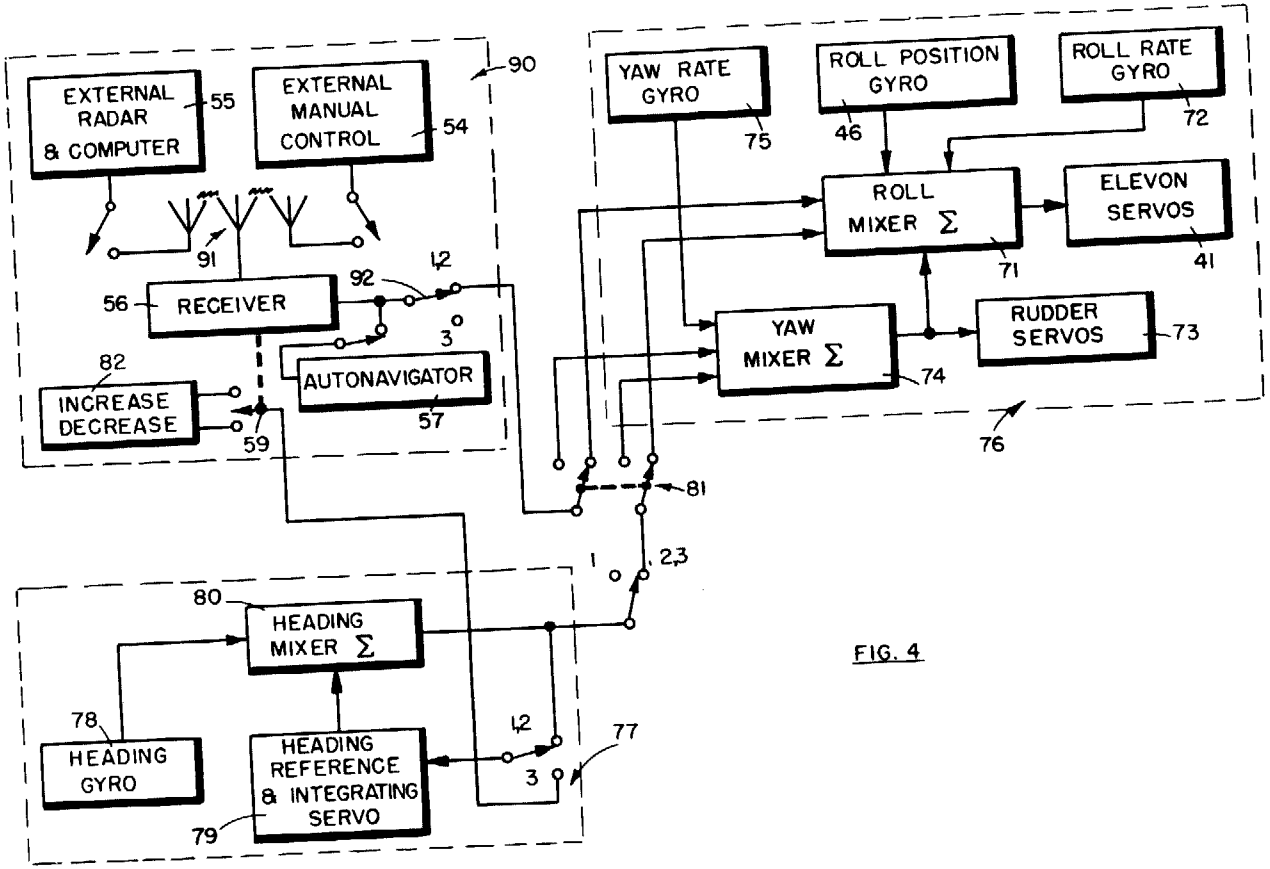
FIG. 4 is a functional diagram of the lateral modes of control.

Thus, the lateral mode components 41, 46, 71, 72, 73, 74 and 75 within the dotted box 76 of FIG. 4 are analogous to the longitudinal components within the box 40 of FIG. 3 and achieve the functions of short period roll and yaw stabilization and roll orientation.

In the lateral modes, maintenance of a specified flight condition to obtain a fixed aircraft heading or guidance along selected curved paths without reverting to manual control is provided by the components within box 77. This arrangement also provides a heading reference in lateral mode 1. The lateral modes comprise mode 1, manual control; mode 2, lateral deviation control; and mode 3, fixed or hold heading control. Each of these lateral modes is available for either bank turns or flat turns. The heading generator 77 comprises a heading gyro 78 which provides a signal indicative of the deviation of the aircraft heading from a selected reference such as magnetic north for example, and a heading reference and integrating servo 79 which has several functions for the several lateral modes. A heading mixer 80 combines the outputs of the heading gyro and heading servo 79 to provide via the flat or bank turn switch 81 a heading error signal to the roll mixer 71 for bank turns or to the yaw mixer 74 for flat turns. In modes 1 and 2 the heading servo follows or integrates, respectively, the heading error output of the heading mixer 80; whereas in mode 3 the servo 79 feeds a heading reference to the heading mixer 80 for comparison with the heading from gyro 78. This heading reference in mode 3 may be varied under control of a commanded heading increment or decrement from increase-decrease generator 82 in response to a command from the receiver 56.

In a manner similar to that described in connection with FIG. 3, space path guidance, specifically turn control, for the lateral modes is provided by the components grouped in box 90 which comprise the external radar and computer 55, the external pilot 54, the receiver 56 and the radio link 91 therebetween. Again the autopilot is also adapted to receive turn control signals from an autonavigator 57 carried by the aircraft controlled by the autopilot. Thus, a turn control signal may be fed through mode selector switch 92 and through bank or flat turn switch 81 to either the roll mixer 71 or the yaw mixer 74 where it is combined with the other inputs to the respective mixers. In effect the turn command signal is applied as the bank angle command to the roll mixer during bank turn operation and as a heading or yaw rate command to the yaw mixer during flat turn operation.

LONGITUDINAL MODE 1

Figure 5:
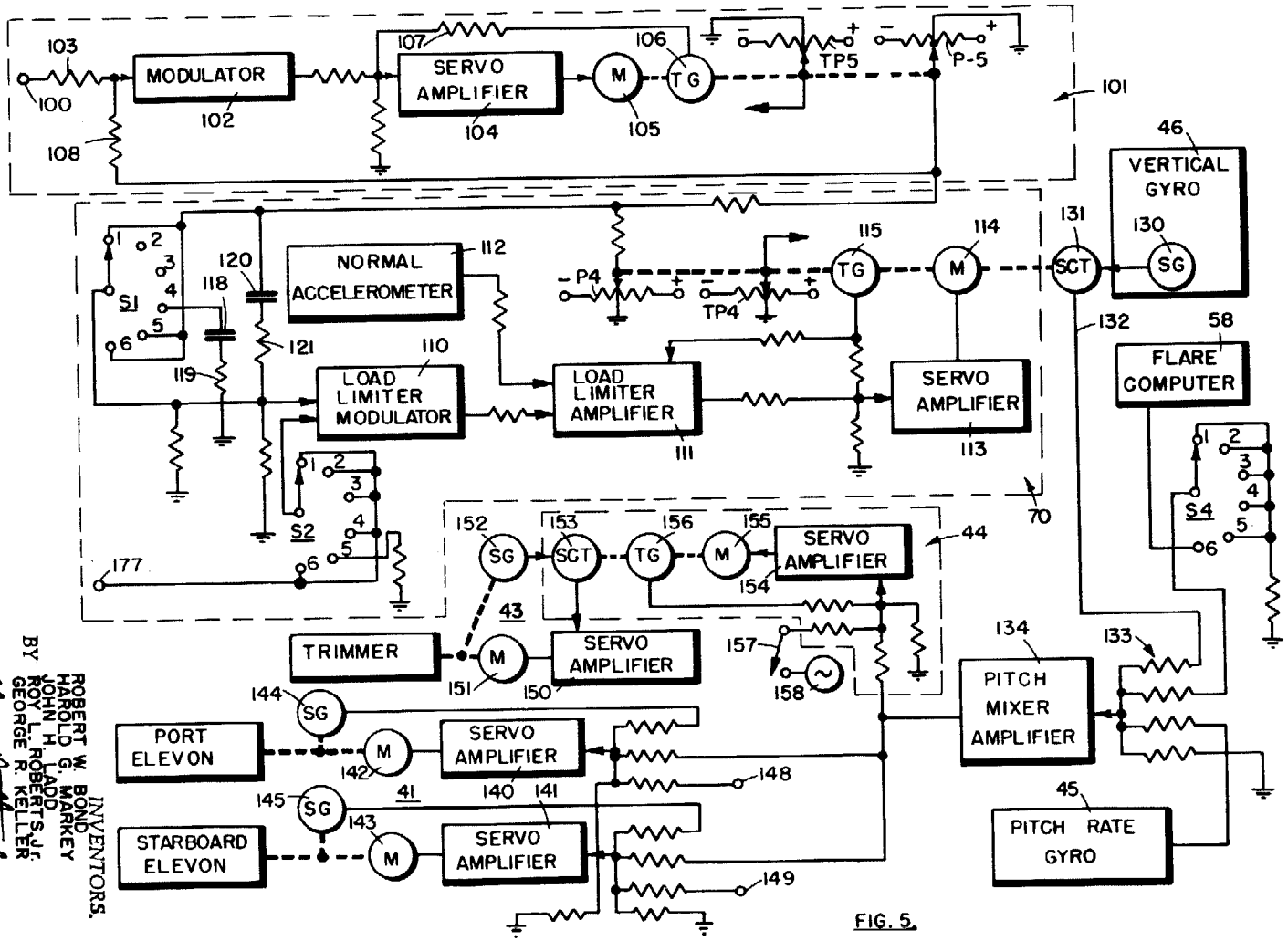
FIG. 5 illustrates details of certain portions of the longitudinal modes.

Illustrated in FIG. 5 are details of the autopilot longitudinal modes. In mode 1, manual pitch angle control mode, the pitch angle of the aircraft as measured by the vertical gyro 46 is controlled solely by the pitch radio command signal. Control is accomplished by use of an error signal proportional to the difference between the command signal and the actual pitch angle to deflect the elevons in unison in the proper direction to bring the aircraft to the commanded angle. When the commanded angle is obtained the elevons return to the center position thereof as the forward trimmer assumes the required trim position.

A D.C. command signal is applied at an autopilot input 100 as a D.C. signal proportional to the commanded pitch angle. The D.C. command signal is fed to a pitch command servo 101 including an input modulator 102 which receives through input resistor 103 the D.C. signal and provides at its output an amplitude modulated A.C. signal having an amplitude of modulation proportional to the magnitude of the D.C. input signal and a phase indicative of the polarity of the input signal. It is to be understood that all the circuitry described herein will utilize the same A.C. source of a frequency such as 400 cycles a second, for example, for purposes of A.C. phase reference and energization as will be apparent to those skilled in the art. The control signal from modulator 102 is fed through an input resistor of a conventional servo amplifier 104 which drives a two-phase servo motor 105 at a speed and in a direction proportional to the amplitude and phase of the servo amplifier input. The motor 105 drives a tachometer generator 106 which provides a feedback via resistor 107 to the input of the amplifier 104 in the form of a signal proportional to the motor shaft velocity to thereby provide rate damping of the servo. The motor also drives the wiper of a telemetering potentiometer TP–5 which provides one of the several inputs to telemetering equipment (not shown) carried by the aircraft. For purposes of test flight observation and for certain control purposes it is desirable to provide telemetering apparatus in the controlled aircraft for radio transmission to a ground station or other remote pilot.

The motor 105 also drives the wiper of a potentiometer P–5 the output of which is fed back through resistor 108 to the input of modulator 102 whereby the signal at the wiper of potentiometer P–5 will at all times follow in magnitude and sense the pitch command signal at input 100. All potentiometers are connected to a suitable source of potential indicated as +, —. The particular arrangement of potentiometers is exemplary only.

The output of the pitch command servo 101 at the wiper of potentiometer P–5 is fed through one bank S–1 of a multi-bank six-position longitudinal mode selector switch. It is to be understood that all six-position banks of the mode selector switch are ganged for operation in unison in response to a mode selection signal hereinafter described. The ganged connections are not illustrated in order to maintain clarity of the drawings. In mode 1 the pitch angle command signal is fed through switch bank S–1 of load limiter 70 to the load limiter modulator 110 to provide an A.C. pitch angle command signal to the load limiter amplifier 111 which also receives an input signal from normal accelerometer 112. The output of the load limiter amplifier 111 is fed as an input to load limiter servo amplifier 113 which drives the servo motor 114. The output of the servo motor 114 drives a tachometer generator 115 to provide a velocity damping feedback to the input amplifier 113 and to the load limiter amplifier 111. The motor 114 also drives the wiper of potentiometer P–4 to provide additional feedback to the load limiter modulator 110 via capacitor 120, resistor 121 and also drives telemetering potentiometer TP–4 for telemetering the load limiter output. The load limiter 70 also includes a second bank S–2 of the mode selector switch for feeding to the load limiter the error signal outputs (on leads 177) of the flight instrument servos in modes 2, 3 and 4 as more particularly described hereinafter. The signals from the flight instrument servos are not coupled to the switch bank S–2 or lead 177 in modes 1 and 6 (see FIG. 6). During mode 4 it is noted that the feedback (from P–4) to the load limiter modulator 110 is shunted through capacitor 118 and resistor 119 for the purpose of application of altitude rate signal. Elements 118 and 119 provide a filter action in the feedback from output to input of the load limiter and thus effect derivative action on the altitude error signal as transmitted through the load limiter.

The shaft position of motor 114 of the load limiting servo is thus proportional to the pitch angle command signal except as modified (as described in the above-mentioned application, Serial No. 460,294) to prevent excessive wing loads. This shaft position of motor 114 is therefore the direct pitch angle command to the remaining portions of the pitch channel. The actual pitch angle of the aircraft is measured by the pitch output of a conventional vertical gyro 46 which may be, for example, of the Sperry Type K–2 and which provides an output via synchro generator 130 to a synchro control transformer 131 which receives as a second input thereof the shaft position of motor 114. The synchro control transformer 131 compares the shaft position of motor 114 with the gyro output from the synchro generator 130 and provides as its output a difference or pitch error signal on lead 132. This error signal on lead 132 is supplied through the resistive summing network 133 as one input to the pitch mixer amplifier 134 which provides as its output a signal proportional to the algebraic sum of the inputs thereto. Also applied to the summing network 133 are the output signal from the pitch rate gyro 45 which is used for pitch damping and the landing flare signal through switch bank S–4 from flare computer 58 more particularly described in the above mentioned application, Serial No. 595,330.

The pitch angle command signal at the output of the pitch mixing amplifier 134 is applied equally and in unison to the elevon servos 41. These servos which may be of any suitable type such as high power rapid response hydraulic servos are herein illustrated for purposes of exposition as electro-mechanical servos comprising port and starboard servo amplifiers 140, 141 driving motors 142, 143 the outputs of which are connected to physically displace the elevons. The elevon positions are sensed by synchro generators 144, 145 and fed back to the input of the servo amplifiers 140 and 141. Thus, the displacement of the elevons will at all times be proportional in magnitude and direction to the magnitude and polarity of the input to the servo amplifiers 140, 141.

Since the elevons additionally provide roll control by being differentially operated, the elevon servos also receive as inputs roll control signals on leads 148 and 149 from the roll mixer 71 (FIG. 4). These roll signals are of mutually opposite phase to provide for the differential operation of the elevons as will be particularly described below in connection with the description of the lateral modes.

The pitch angle command signal from the output of the pitch mixing amplifier 134 is also applied through the pitch trim integrator 44 to the trimmer servo 43. The trimmer servo, as all the other actuatng servos, may be of well-known electro-hydraulic configuration but is here illustrated as comprising servo amplifier 150 driving motor 151 which actuates the trimmer. The trimmer position is sensed by synchro generator 152 to feed back a trimmer position signal to synchro control transformer 153 which also receives the shaft output of the trimmer integrator and thus provides to the servo amplifier 150 a signal in accordance with the difference between the two inputs to the synchro control transformer 153.

The trimmer integrator 44 which provides to the trimmer servo a signal proportional to the integral of the pitch angle control signal comprises a servo amplifier 154 having an input from the output of the pitch mixer amplifier 134 and having an output which drives motor 155 and tachometer generator 156. The shaft position of motor 155 is the integrated output since the motor velocity is proportional to the amplifier output. Synchro control transformer 153 geared to the motor shaft provides the appropriate error signal to cause the trimmer servo 43 to follow the integrator output. Velocity damping is provided by the feedback of the tachometer generator signal to the amplifier input.

For the purpose of deflecting the trimmers to drop the nose of the aircraft gently upon landing, a switch 157 is mounted on landing gear 20 to be operated upon compression of the rear wheels at touchdown. When operated, the switch 157 feeds a fixed signal from source 158 to the input of the amplifier 154 in a sense to effect the desired nose-down deflection of the trimmers. The switch 157 may or may not be held open during takeoff by any suitable means, not shown, since the manual pitch angle command signal applied during take-off will itself over-ride the landing signal provided through switch 157.

LONGITUDINAL MODE 2

In longitudinal control mode 2 (indicated air speed control) the pitch angle of the aircraft is controlled as a function of the difference between the aircraft indicated air speed as measured by the indicated air speed meter 160 (FIG. 6) and the commanded indicated air speed signal as established by the indicated air speed (IAS) reference servo 161. In all other modes of longitudinal control except mode 5 the IAS reference servo 161 follows the aircraft indicated air speed directly. When mode 2 is selected the IAS servo 161 is stopped and holds the IAS value existing at the time of switch to mode 2. The IAS error signal appearing on lead 162 is applied via lead 177 to the load limiting servo 70 through switch bank S–2 (FIG. 5). Thus, the pitch angle of the aircraft will be varied in accordance with the IAS error and the aircraft speed will increase or decrease as necessary to bring the error to zero.

The indicated air speed meter may be of a conventional type such as Kollsman Type 1336–014 and feeds a signal to synchro control transformer 163 which also receives a signal from the output of the IAS servo. The synchro control transformer 163 feeds through bank S–5 of the longitudinal mode selector switch to the input of a servo amplifier 164. The amplifier 164 drives motor 165 which in turn drives tachometer generator 166 and synchro generator 167. The tachometer provides a velocity feedback damping to the amplifier input. The motor 165 also drives the wiper of telemetering potentiometer TP–1. Thus, it will be seen that in modes 1, 3, 4 and 6 the switch bank S–5 connects the input of the servo amplifier 164 to the output of the synchro control transformer 163 and the servo 161 is a rapid follow-up servo having as its input the output of the IAS meter 160. When mode 2 (or mode 5) is selected the shaft position of motor 165 and thus the rotor of synchro generator 167 stops in the position obtained at the instant of mode selection and thus the reference servo 161 stores an IAS reference value. In this mode the reference value stored by the servo 161 may be selectively varied by operation of the increase-decrease switch 51 which feeds a signal with either of two opposite polarities from source 52 to the input of the servo amplifier 164. Thus, the servo 161 may operate in longitudinal mode 2 to increase or decrease the indicated air speed of the aircraft at a low constant rate to achieve small corrections of speed in this mode. It is to be noted that the pitch radio command is also effective in this mode but, due to the error reducing action of the load limting servo and in particular the capacitor 120, this effect is only temporary. Thus, the radio commanded pitch angle may be used as an instantaneous or momentary override in case of emergency but its effect gradually disappears.

Reference is made to FIG. 5 for description of the override action. Since the pitch angle command signal from potentiometer P–5 of servo 101 is transmitted through capacitor 120 in modes 2, 3 and 4, the remote pilot can override these modes for short periods. As capacitor 120 charges to the newly applied signal resulting from an override input (i.e. a pitch radio command), the effect of this override gradually disappears. In these same modes the instrument error signal 177 is applied directly to the load limiter modulator 110 and therefore is not affected by capacitor 120. Thus, after override action, the long term effect is that the vehicle will return to the condition established by the flight instruments unless the pilot chooses to select another mode.

LONGITUDINAL MODE 3

Figure 6:
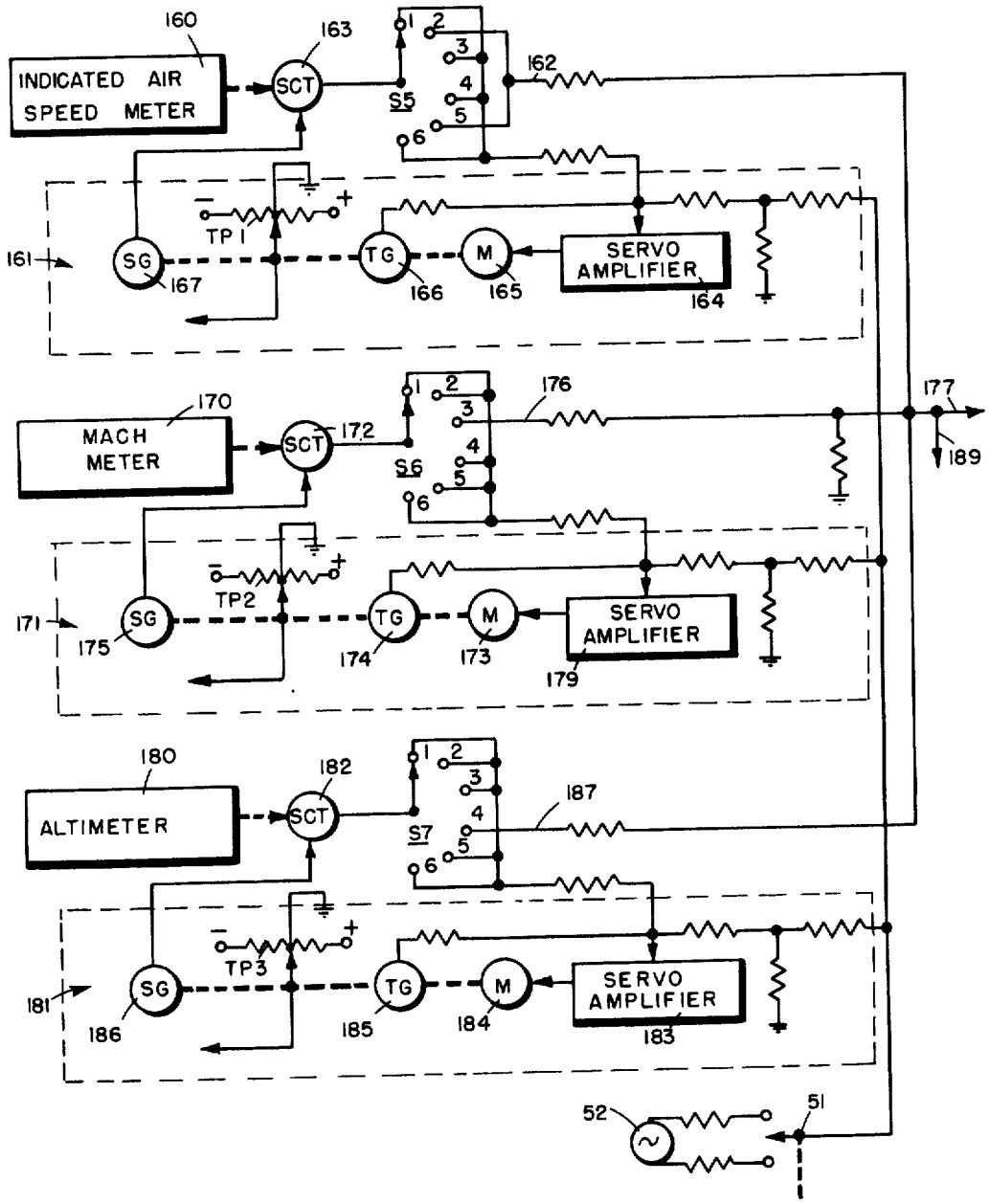
FIG. 6 illustrates details of the longitudinal mode flight instrument servos.

In longitudinal control mode 3 (Mach number control) the pitch angle of the aircraft is controlled as a function of the difference between the aircraft Mach number as measured by Mach meter 170 of FIG. 6 and the Mach number commanded and stored by the Mach number reference servo 171. The Mach meter may be a conventional instrument such as the Kollsman Type XA–1537–01 which feeds a signal proportional to the Mach number of the aircraft as a shaft displacement to synchro control transformer 172. In all modes but mode 3 the output of the synchro control transformer is fed through switch bank S–6 of the longitudinal mode selector switch to the input of the Mach meter reference servo 171 comprising servo amplifier 179, motor 173, tachometer generator 174, synchro generator 175 and telemetering potentiometer TP–2 all constructed and arranged in a manner similar to the corresponding components of the IAS reference servo 161. The reference servo 171 is all modes but mode 3 directly follows the Mach meter output but holds and stores the Mach number existing at the instant of selection of mode 3. Thus, in mode 3 the Mach number error signal appearing on lead 176 may be applied to the load limiting servo through lead 177 in much the same manner as the indicated air speed error signal as applied in mode 2. The Mach number error signal similarly controls the aircraft Mach number by control of pitch angle in a manner similar to that described in connection with the IAS servo 161. The reference Mach number stored by Mach number reference servo 171 may be varied by the previously described on-off command signal which operates switch 51.

LONGITUDINAL MODE 4

In longitudinal control mode 4 (altitude control) the pitch angle of the aircraft is controlled as a function of the difference between the aircraft altitude as measured by the altimeter 180 and that commanded or stored by the altitude reference servo 181. The altimeter may be a conventional instrument such as the Kollsman Type 1556B–01 which feeds to synchro control transformer 182 an altitude signal in the form of a shaft displacement. In longitudinal modes 1, 2, 3, 5 and 6 the output of the synchro control transformer 182, which also receives as an input the output of the reference servo 181, is fed through switch bank S–7 as an input to the reference servo. The servo 181 comprises a servo amplifier 183, a motor 184, tachometer generator 185, synchro generator 186 and a telemetering potentiometer TP–3 all constructed and arranged as are the similar elements of the reference servos 161 and 171. As with the other reference servos, servo 181 follows the output of the instrument 180 in all modes other than its own mode 4 and the value of selected altitude at the time of selection of mode 4 is stored as a reference altitude in the servo 181 whereby the output of synchro control transformer 182 comprises the altitude error which is fed via leads 187 and 177 to the load limiter in a manner similar to that described in connection with servos 161 and 171. The altitude reference provided by the servo 181 may be varied by on-off commanded operation of switch 51.

The dynamic properties of the load limiting servo are modified in mode 4 by switch bank S–1 which connects capacitor 118 and resistor 119 to the load limiter servo feedback signal from potentiometer P–4. By this means the load limiter servo partially responds in proportion to the rate of change of altitude for stabilization of altitude control.

LONGITUDINAL MODE 5

In longitudinal control mode 5 (vertical deviation control) external radar equipment which may be ground based is utilized to measure the position of the aircraft with respect to the desired landing approach path. This mode is provided to make available IAS error information to the ground radar to enable radar control. Except for the fact that the IAS reference servo 161 is stopped by switch bank S–5 in mode 5, this mode is identical to mode 1. Therefore, the pitch angle of the aircraft is controlled solely by the commanded pitch angle. In this mode the IAS error is available at telemetering point 189 (FIG. 6) to the remote control pilot or ground station to thereby assist him in adjusting engine thrust or glide brakes to maintain proper air speed.

Mode 5 is intended primarily for use during landing approach. During the approach the pilot can control pitch angle as necessary to maintain the proper approach path and can control the throttle or glide brakes to maintain proper approach speed. If automatic measurement of vertical deviation from the desired path is available from instrumentation such as radar or optical devices combined with an appropriate computer, a vertical deviation pitch angle signal can be automatically computed and coupled directly to the remote pilot's pitch angle control to achieve automatic approach path control.

It will be readily appreciated that the IAS error signal may also be utilized in mode 5 to provide automatic glide brake control as a function of IAS error.

LONGITUDINAL MODE 6

As more particularly described in the above mentioned application Serial No. 595,330, mode 6, landing flare control, may be selected either automatically at a preset altitude or manually as each of the other modes. In this mode as described in application Serial No. 595,330 the pitch angle of the aircraft is controlled to provide the proper flare-out to touchdown.

LATERAL MODE 1

Figure 7:
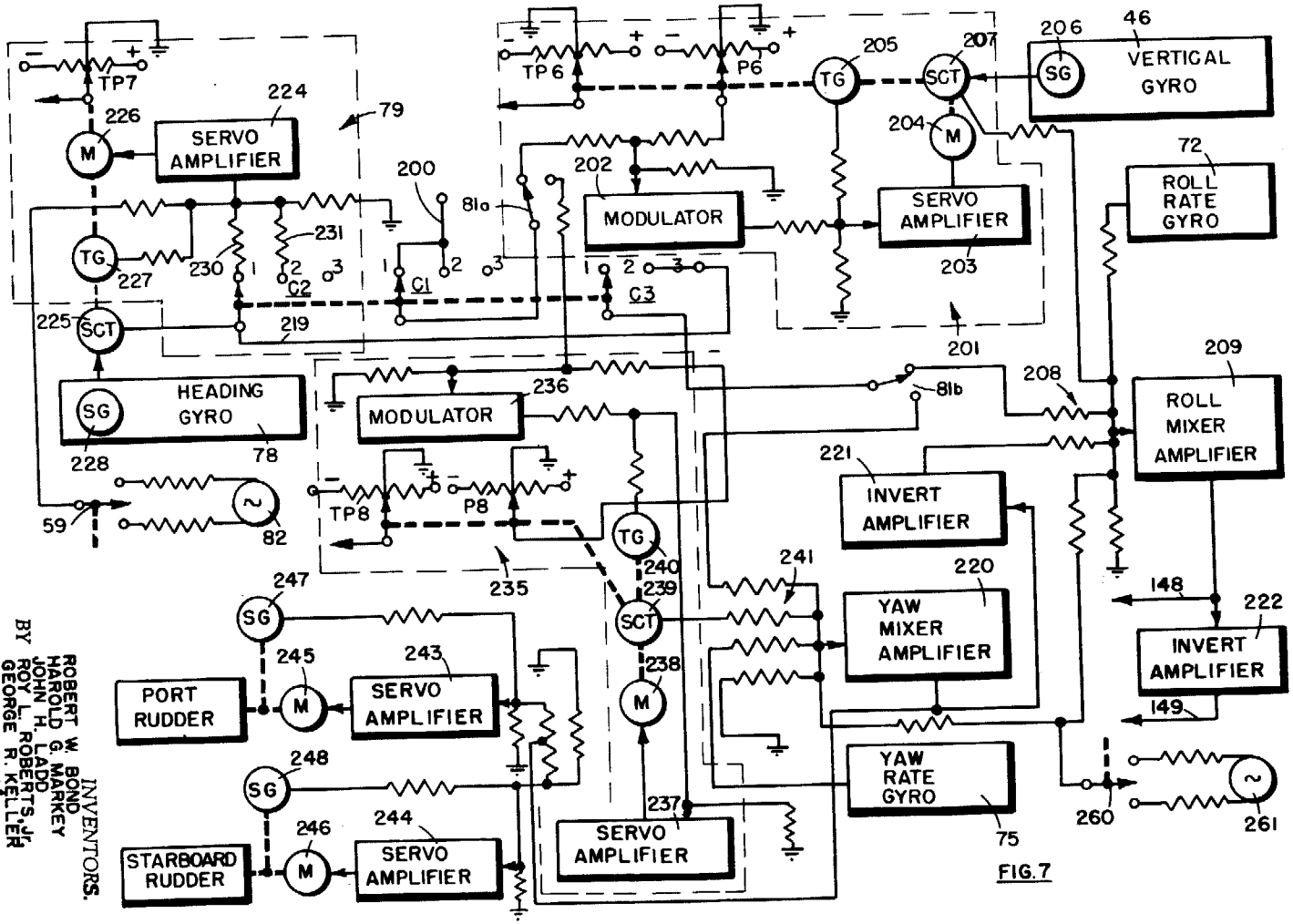
FIG. 7 illustrates details of the lateral modes.

Referring now to FIG. 7, a commanded turn signal appears on lead 200 from the radio receiver or autonavigator as a D.C. signal proportional to desired aircraft bank angle or yaw rate for bank turns or flat turns, respectively. The turn command signal is fed through bank C–1 of a multibank mode selector switch and to flat turn switch 81a as the input to a roll command servo (in dotted box) 201 (from the switch 81) during bank turn operation. The turn command signal is fed to the input of a roll command servo modulator 202 which provides as its output and as the input to a servo amplifier 203 an amplitude modulated A.C. signal having a magnitude and phase in accordance with the magnitude and polarity of the D.C. input to the modulator. The servo amplifier 203 drives a motor 204 which in turn drives tachometer generator 205, telemetering potentiometer TP–6, and a feedback potentiometer P–6 from the wiper of which is obtained a D.C. feedback to the input of the modulator 202 in accordance with the output of the roll command servo. Velocity damping of the motor 204 is provided by feedback from the tachometer generator 205 to the input of amplifier 203. The roll output of vertical gyro 46 which may be a conventional instrument such as a Sperry Type K–2 is fed through synchro generator 206 as a second input to synchro control transformer 207 which is also driven by the motor 204. The motor shaft position by virtue of the feedback to the modulator 202 from potentiometer P–6 is thus proportional to the turn command signal. The synchro control transformer 207 thus compares or algebraically combines the roll position of the aircraft as measured by the vertical gyro with the commanded bank angle and feeds a bank angle error signal through resistive summing network 208 to the input of the roll mixer amplifier 209. The roll mixer amplifier 209 also receives a roll rate stabilizing signal from roll rate gyro 72 and a rudder deflection command signal from yaw mixer amplifier 220 via phase inverting amplifier 221. The output of the roll mixer amplifier 209 is fed via lead 148 to the port elevon servo and via phase inverting amplifier 222 and lead 149 to the starboard elevon servo (FIG. 5).

Thus, the elevons are differentially actuated for roll control in accordance with the differences between the commanded bank angle and the measured bank angle. In lateral mode 1, only the commanded bank angle signal is applied to the roll mixer amplifier 209 together with the roll rate and rudder command signals.

LATERAL MODE 3

In both of lateral modes 2 and 3, lateral deviation control and hold heading control, respectively, the signal from the heading gyro is modified by the heading reference servo 79. The heading or directional gyro 78 may be a conventional instrument such as a Sperry Type S–3 providing a directional reference by producing electrical signals indicative of the heading of the aircraft. In lateral mode 1, bank angle control, the heading reference servo is a rapid follow-up servo having an input from the heading gyro.

The heading reference servo comprises a servo amplifier 224 having an input in mode 1 via lateral selector switch bank C–2 from synchro control transformer 225 and an output driving a motor 226. The motor drives a telemetering potentiometer TP–7, tachometer generator 227, and the synchro control transformer 225. The tachometer generator provides velocity damping feedback to the servo amplifier. The output of the heading gyro is a shaft displacement measured by synchro generator 228 which provides an input to synchro control transformer 225. The latter provides as its output the difference between its inputs. Thus, the heading reference servo is similar in structure and operation to the reference servos 161, 171 and 181 of FIG. 6.

In lateral mode 3, hold heading control, the heading reference servo 79 is stopped by virtue of switch bank C–2 (in position 3 thereof) of the lateral mode selector switch and the output of the heading servo at the output of synchro control transformer 225 at lead 219 thus comprises the heading error which is the difference between the actual heading of the aircraft as measured by gyro 78 and the reference heading stored by the servo 79 at the instant of switching to lateral mode 3. In this mode the reference heading stored by servo 79 may be varied by a commanded on-off operation of switch 59 to provide as an input to the heading reference servo a fixed-level signal of a selected phase for generator 82. Thus, the remote pilot can change the reference heading at a low rate to compensate for errors caused by gyro drift and the effects of winds.

The heading error is fed from synchro control transformer 225 in modes 2 and 3 through lateral mode switch bank C–3 and through bank-flat turn switch 81b (in the illustrated position thereof) as an input to the roll mixer amplifier 209. Thus, the aircraft is positively stabilized on a constant heading as measured by the direction of the gyro 78 in lateral mode 3 and any heading deviations are corrected by banked turns. In all bank turn control modes yaw damping is provided by feedback from yaw rate gyro 75 to the rudder servos 73. If manual control is desired to be available in mode 3, switch bank C–1 may be omitted and entirely by-passed.

LATERAL MODE 2

In lateral control mode 2 (lateral deviation control) the aircraft may by controlled along a predetermined path. The bank angle of the aircraft is controlled by a signal from the directional gyro 78 in addition to the bank angle command signal on lead 200. However, in this mode the signal from the directional gyro which is proportional to deviation from the reference heading is modified by the heading reference servo 79. The combination of these feedback signals causes the aircraft to change its heading and at the same time to assume a small rate of change of heading both in proportion to the turn command signal. The use of heading feedback provides highly stabilized directional control but at the same time the modification of the heading feedback permits guidance along a curved path. The radio command causes a proportional change of heading of the aircraft from the heading reference which tends to cause the output of the heading gyro to become equal to the radio command. In addition, the heading reference is changing in accordance with the difference betwen the gyro output and heading reference. This changing reference is added to the gyro output which is fed to the aircraft controls together with the radio command. Therefore, the aircraft controls are supplied with a signal component which causes a slow rate of change of heading in addition to the proportional change of heading.

In mode 1 the heading reference servo 79 has an input from the synchro control transformer 225 via a relatively small resistor 230 to provide for operation thereof as a fast follow-up servo. In mode 2 the output of the heading gyro 78 is applied via synchro control transformer 225 to the input of servo amplifier 224 by a resistor 231 which is substantially larger than resistor 230. Thus a substantially smaller fraction of the feedback is applied to amplifier 224 and the heading reference servo operates as a slow integrator of its input through resistor 231. Since this input is a fraction of the heading deviation signal from the output of synchro control transformer 225, the heading reference servo slowly changes the heading reference in such manner as to decrease this heading deviation signal. Thus, the heading input to roll mixer amplifier 209 in mode 2 comprises the heading deviation of the aircraft as modified by the gradual change in the heading reference servo.

FLAT TURN

Each of the three lateral bank turn modes previously described are available as flat turn modes although lateral modes 2 and 3 are not preferred for flat turns in high speed flight because of limited maneuverability. For flat turns, ganged switches 81a and 81b are operated from the illustrated position. In flat turn modes 1 and 2 the turn command signal appearing on lead 200 is fed through switch bank C–1 and switch 81a to flat turn command servo 235 which comprises a modulator 236, servo amplifier 237, motor 238, synchro control transformer 239, tachometer generator 240, feedback potentiometer P–8, and telemetering potentiometer TP–8 all constructed and arranged as are the similar components of the roll command servo 201. Thus, the output of the servo 235 from synchro control transformer 239 thereof will be a signal proportional to the flat turn command signal and is fed through resistive summing network 241 to yaw mixer amplifier 220. Amplifier 220 has an input from the yaw rate gyro 75 and, in modes 2 and 3, an input from the heading reference servo 79. Each of the three rate gyros 45, 72 and 75 may be identical, conventional instruments such as Gyro Mechanisms Model 26, 500 (Kenyon).

The rate gyros, of course, are oriented orthogonally to each other so as to sense the respective attitude rates. The output of the yaw mixer amplifier 220 is fed to the rudder servos to operate the port and starboard rudders in unison. The rudder servos which also may be of conventional electro-hydraulic configuration are illustrated as comprising servo amplifiers 243, 244, motors 245, 246 and synchro generator pickoffs 247, 248 all constructed and arranged as are the similar elements of the elevon servos 41.

When using banked turns, external control signals through a proportional radio command channel are applied to the roll channel, and produce a roll attitude change with respect to the vertical gyro reference. When using flat turns the external control signals are applied to the yaw channel, and produce a proportional yaw rate.

The three quantities, roll angle, roll rate and yaw rate, are used in all lateral control modes and hence form the nucleus of the lateral section of the autopilot. Switching to and from different control modes merely adds other functions to this basic configuration, and switching from bank turns to flat turns switches these other functions from the roll to the yaw channels.

In order to reduce crab angle (lateral deviation of the aircraft longitudinal axis from its velocity vector) on touchdown due to cross winds and thereby reduce the accompanying lateral forces of the landing gear, an on-off command signal may be utilized to operate switch 260 of FIG. 7 and apply a fixed-level signal of a selected phase as an additional input to both yaw mixer amplifier 220 and the roll mixer amplifier 209. The crab angle signal from switch 260 and generator 261 thus provides a rudder off-set and differential elevon off-set of a predetermined magnitude but in a chosen direction and at a chosen time.

RADIO CONTROL

Figure 8:
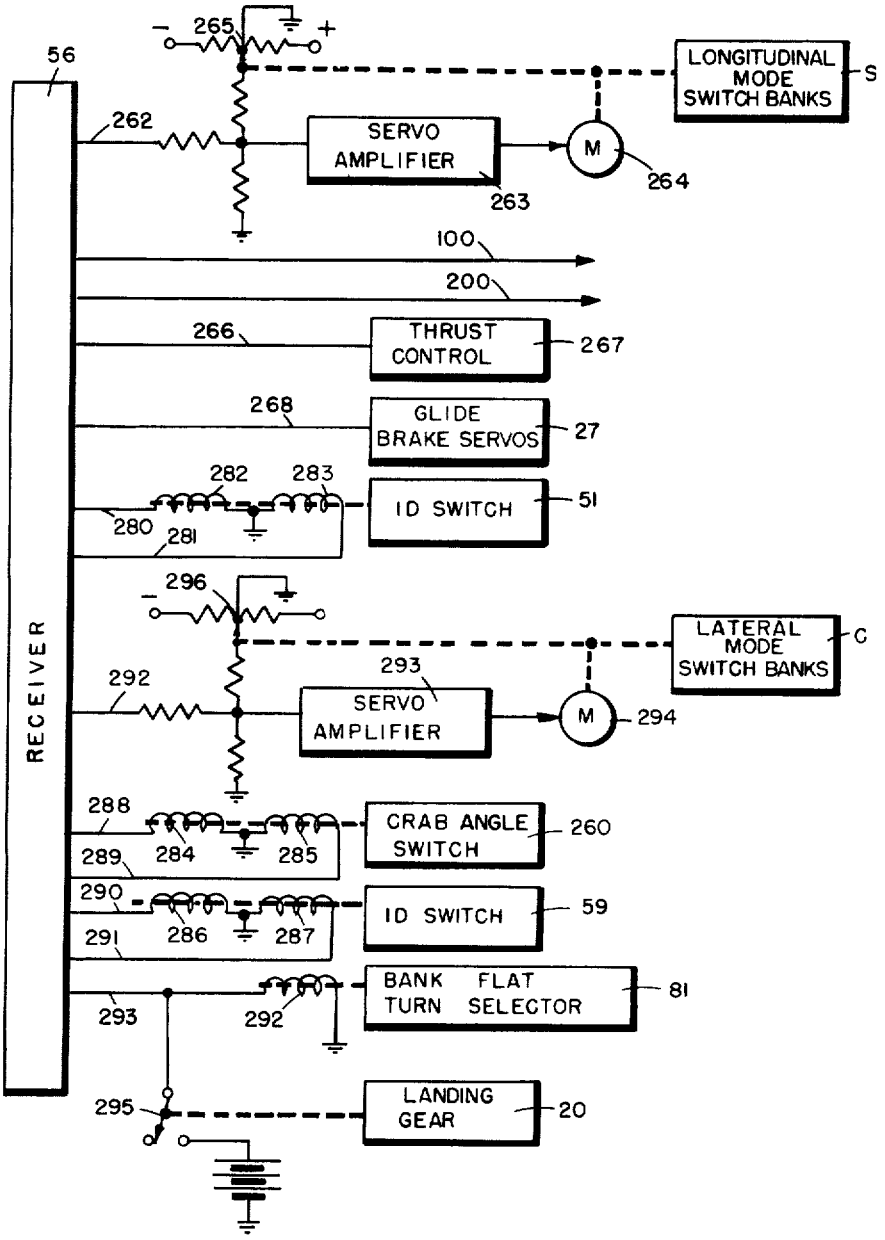
FIG. 8 illustrates the manner in which the external commands are applied to the autopilot.

Illustrated in FIG.8 are some of the receiver derived control and switching signals for pitch mode selection including arming of the flare computer. The receiver 56 will provide a D.C. signal of one of six selected amplitudes which appears at receiver output 262 and is fed as an input to a servo amplifier 263. The amplifier 263 drives a motor 264 which in turn positions the wiper of a potentiometer 265 providing a motor shaft position feedback to the amplifier. Thus, the motor shaft will be displaced in an amount proportional to the level of the longitudinal mode control signal on lead 262 and may thus position the movable contacts of the longitudinal mode selector switch S.

Proportional D.C. pitch and turn command signals appear at receiver output terminals 100 and 200, respectively, to be fed to the pitch radio command servo 101 of FIG. 5 or the roll or flat turn control radio command servos 201 or 235 of FIG. 7.

A proportional throttle control signal is provided at output lead 266 of the receiver to effect actuation of the aircraft engine throttle 267 in accordance with the magnitude and polarity of the throttle control signal. Similarly, a proportional glide brake control signal on lead 268 may be applied to effect displacement of glide brake servos 27.

Actuation of increase-decrease switch 51 of FIG. 6 may be effected in either direction by on-off signals appearing on leads 280 and 281, respectively, which are connected to a pair of relay coils 282 and 283. The coils are connected together and grounded whereby a signal on lead 280 or 281 will energize the relay coils in the appropriate direction to drive the armature of switch 51 as desired. In a similar manner, the crab angle switch 260 and the heading increase-decrease switch 59 may be operated in the selected direction by means of relay coils 284, 285, 286 and 287 by on-off signals appearing at receiver outputs 288, 289, 290 and 291. The lateral mode selector switch banks C may be operated in response to a three-level D.C. signal at receiver output 292 by means of servo amplifier 293, motor 294 and feedback potentiometer 296 constructed and arranged as are the similar components of the pitch mode selector servo.

Operation of the ganged bank-flat turn switches 81 (81a and 81b of FIG. 7 may be effected by energization of a relay coil 292 from an on-off signal appearing at receiver output terminal 293. In the absence of a signal at output 293 the coil 292 is de-energized and the switches 81a and 81b are in the bank position illustrated in FIG. 7.

For automatic flat turn selection on the ground a micro switch 294 (FIG. 1) on the landing gear 20 may operate a switch 295 by means of a relay or otherwise. Switch 295 when operated and closed may alternatively energize relay coil 292 to automatically select flat turn control at touchdown.

A typical reference servo is illustrated in FIG. 9 as having a synchro generator 300 comprising three stator coils 301 and a rotor coil 302 energized by a source 303 which is synchronized with the other A.C. sources of the autopilot or may be the same source commonly utilized throughout the system. The output of the synchro generator energizes the three stator coils 304 of the stator or synchro control transformer or summing device or comparator 305 which has a rotor coil 306 angularly displaced in accordance with the shaft input 307 from the instrument 308 which may be any one of the meters 160, 170, 180 of FIG. 6 or the motor 226 of the heading reference servo. The output of the synchro control transformer 305 which is the algebraic sum of the shaft input 307 and the electrical input from the synchro generator 300 may be obtained on lead 309. This output may be fed through a switch 310 to the input of servo amplifier 311 which drives motor 312. The motor 312 drives the tachometer generator 313 as previously described, the wiper 314 of storage potentiometer 315 and the rotor 302 of synchro generator 300. Thus, with switch 310 in the position illustrated the output signal 309 remains very small and the servo shaft which drives rotor coil 302 and wiper 314 rapidly follows the input 307. In the other position of switch 310 a signal on the wiper 314 remains at a value indicating the input 307 at the time of operation of switch 310. Thus, a reference value is stored in potentiometer 315 and fed back to the control transformer 305 via synchro generator 300 (which also stores the reference as a displacement of its rotor). The output 309 is then the difference between the two inputs. In this condition the stored reference value may be varied by operation of the three-position increase-decrease switch 317 which may provide an additional amplifier input of either phase.

EXEMPLARY FLIGHT

A brief outline of a typical one of numerous flight plans which have been made with the autopilot of this invention will provide an example of the possible uses of the described invention. Such a flight would call for either of two remote operators, (1) a ground pilot with a complete display of telemetered information and control of the aircraft through the on-off and proportional radio command channels, or (2) an airborne aircraft pilot (in a chase plane) also with control of the aircraft through the radio command channels. In the latter situation a third pilot would be required at the controls of the pilot's chase plane. Since most of the performance ranges of the aircraft exceed those of the chase plane, a flight plan requiring continuous chase plane aircraft visual contact would be limited in many aspects by the chase plane performance.

Longitudinal control mode 1 (manual pitch angle control) is selected by the remote pilot, and the pitch angle command is held at a preselected constant value. The autopilot error signal will rotate the forward trimmers to their nose-up limit and the elevons up to commanded value.

Lateral control mode 2 (lateral deviation control) is selected. While on the ground the rudder and differential control of the wheel brakes provide steering control.

The chase plane is brought into position flying a few hundred feet above the runway at approximately the take-off velocity of the aircraft. While still several thousand feet behind the aircraft, radio command control is given to the pilot in the chase plane.

The pilot advances the throttle to the full thrust position.

When the chase plane is at an optimum distance behind the aircraft, the chocks are pulled.

While the aircraft is accelerating along the runway the pilot watches its heading and applies steering corrections through the turn proportional radio command channel.

After the rear wheels of the aircraft leave the ground, the autopilot switches automatically from flat turn control to bank turn control, and the landing gear retraction sequence is started. The aircraft now is in lateral control mode 2 (lateral deviation control) with bank turns.

After the aircraft leaves the ground it continues to climb and accelerate. The chase plane pilot maneuvers the chase plane into a position somewhat below and to the side of the aircraft and with the same forward and climbing speeds.

The pilot allows the climbing and forward speed of the aircraft to increase to selected values within the performance capabilities of the chase plane. Then by reducing the throttle, and adjusting the pitch angle as necessary, the aircraft is stabilized at the selected forward speed.

After the aircraft forward speed has been approximately stabilized at the selected value, longitudinal control is switched to mode 2 (IAS control) or mode 3 (Mach number control). If necessary, small changes in air speed are accomplished by the flight instrument increase-decrease radio command. The aircraft is still climbing.

When the aircraft reaches a preselected altitude, the aircraft pilot throttles back until the rate of climb decreases approximately to zero. Then longitudinal control is switched to mode 4 (altitude control).

After switching to mode 4, the aircraft pilot advances the throttle to full and allows the air speed to increase. When the aircraft air speed reaches the value selected for the cruise-out phase of the flight, the throttle is adjusted to hold that value.

Although small changes of heading can be made rapidly in lateral control mode 2, large changes are limited to low rate of change; consequently, large heading changes normally are accomplished in lateral control mode 1 bank-angle control). After the aircraft is turned as necessary, and is flying straight and level on approximately the desired heading, the aircraft pilot switches lateral control to mode 3 (hold heading control). If necessary, small heading adjustments are made through the heading increase-decrease radio command.

Turns are made by switching lateral control to mode 1 (manual control), in the manner used during cruise-out while in longitudinal mode 4 (altitude control).

While in a turn the throttle can be left at the same setting as required for the desired speed in straight and level flight. Although the increase in drag during the turn will cause the aircraft to decelerate, it will return to the original speed when again in straight and level flight. Longitudinal control mode 4 (altitude control) prevents the loss of altitude in the turn, except for small transient deviations.

After the turn around is completed, lateral control is switched back to mode 3 (hold heading control) for cruise-back.

The aircraft is decelerated to the air speed desired for the landing approach by decreasing the throttle setting.

At the appropriate time the aircraft pilot changes the aircraft heading by switching lateral control to mode 1 (manual control), in the manner used during cruise-out, to line up with the landing runway.

The approach is started at a precalculated point from the runway which is either indicated by ground radar and called to the aircraft pilot or noted by the aircraft pilot through the use of natural landmarks. At this point longitudinal control is switched to mode 5 (vertical deviation control). This mode provides manual pitch angle control (as in mode 1), and IAS deviation from the initial value (at the instant of switching) is telemetered to the ground control station from TP–1.

The landing gear is extended and the correct rate of descent is maintained by pitch angle adjustment. The glide angle, as determined by aircraft and chase plane capabilities, is monitored by the ground radar with the ground control station calling out noted deviations to the aircraft pilot or sending appropriate control signals directly to the aircraft. In addition, the aircraft pilot may use the chase plane's rate-of-climb meter and line-of-sight navigation to bring the aircraft down.

The correct air speed is maintained by throttle adjustment. The ground control station calls out air speed deviations to the aircraft pilot. As an additional aid, the chase plane is maintained at the desired air speed to make aircraft speed deviations more apparent to the aircraft pilot.

The aircraft pilot switches to lateral control mode 2 (lateral deviation control) for use throughout approach and landing.

Near the end of the approach the aircraft pilot arms the flare computer by switching longitudinal control to mode 6 (landing flare). The autopilot continues to operate as in mode 5 until the flare computer begins the flare.

At a preset altitude the flare computer automatically assumes control of the aircraft pitch angle, and gradually reduces the aircraft sinking speed as its altitude decreases. The autopilot provides immediate manual over-ride through the pitch proportional radio command channel for use in an extreme emergency.

The throttle is cut by the aircraft pilot to a setting which provides a predetermined value of average thrust during the flare.

At rear wheel touchdown, the throttle is cut to idle, the autopilot is switched from bank turn to flat turn lateral control, and the autopilot controls the forward trimmers to lower the nose. These switching functions are actuated automatically by the rear wheel switches.

When the nose wheel is on the runway a switch not shown closes automatically to release a drag chute for deceleration if necessary.

Rudder deflection and differential braking are used for steering corrections, as during the take-off ground run. Control of the aircraft is transferred from the aircraft pilot to the ground pilot.

It will be seen that the described autopilot in a single system provides a number of different flight plans and different types of flight operation by a unique combination of a number of selectable control modes. The control exercised in each particular mode, longitudinal and lateral, is of a nature such as to particularly lend itself to control in combination with any of the other selected modes, lateral or longitudinal. Moreover, each of the alternatively selectable modes is particularly arranged to be compatible with alternative control in each of the other modes by virtue of the provision of a simplified and basic control nucleus upon which any one of the selected automatic modes may be superimposed.

Although this invention has been described and illustrated in detail, it is to be clearly understood that the same is by way of illustration and example only and is not to be taken by way of limitation, the spirit and scope of this invention being limited only by the terms of the appended claims.

We claim:

[1. In combination with an aircraft having control surfaces, stabilizing means on said aircraft for generating stabilizing rate signals, flight instrument deviation means for generating a plurality of parameter signals each indicative of the deviation of a measured flight parameter from a selected value thereof, means for generating a manual control signal indicative of a desired aircraft attitude, means for selecting one of said parameter and control signals, mixing means for algebraically combining said selected signal with said stabilizing signals, actuator means responsive to said combining means for operating said surfaces, and means operable during the selection of one of said parameter signals for providing a momentary connection of said manual control signal to said mixing means whereby a temporary overriding of said one selected parameter signal may be achieved.]

[2. Control apparatus for an aircraft having main and auxiliary pitch control surfaces, gyroscopic means for generating rate signals indicative of the pitching rate of said aircraft, flight instrument deviation means for generating a plurality of parameter signals each indicative of the deviation of a measured flight parameter from a selected value thereof, space path guidance means for generating a guidance signal indicative of a desired aircraft pitch attitude, means for selecting one of said parameter and guidance signals, mixing means for algebraically combining said selected signal with said rate signals, actuator means responsive to said combining means for displacing said main surface in accordance with said combined signals, means for integrating said combined signals, and actuator means responsive to said integrated signals for displacing said auxiliary surface.]

[3. In combination with an aircraft having pitch control surfaces, gyroscopic means for generating pitch rate signals, velocity deviation means for generating a velocity error control signal indicative of the difference between speed of said aircraft and a selected reference signal, altitude deviation means for generating an altitude error control signal indicative of the difference between altitude of said aircraft and a selected reference signal, means for selectively varying at least one of said selected reference signals, means for generating a pitch control signal, mode selector means for selecting one of said control signals, pitch mixing means for algebraically combining said selected signal with said pitch rate signals, actuator means responsive to said mixing means for operating said pitch surface, and means operable during selection of one of said error signals for providing a momentary connection of said pitch control signal to said mixing means.]

[4. The apparatus of claim 3 wherein at least one of said deviation means comprises a flight condition sensing instrument, a follow-up servo having an input, summing means having inputs from said instrument and follow-up servo for providing an error output indicative of the algebraic sum of the inputs thereto, said mode selector means comprising a multi-position switch for alternatively coupling and decoupling said error output to said follow-up servo input, said error output providing the error control signal generated by said one deviation means, said selective varying means comprising a source of potential and a switch operable to couple or decouple said follow-up servo input to either side of said source.]

5. In combination with an aircraft having roll and yaw control surfaces, gyroscopic means for generating roll and yaw rate signals, heading deviation means for generating a first heading control signal indicative of the difference between the heading of said aircraft and a selected heading reference signal, means for selectively varying said heading reference signal, said heading deviation means including means for generating a second heading control signal indicative of the combination of selected heading deviation and a selected rate of change of heading deviation, means for generating a turn control signal, mode selector means for alternatively selecting said turn signal, said first heading control signal or both said turn signal and said second heading control signal, roll and yaw mixing means having inputs receiving said roll and yaw rate signals, turn mode selector means for alternatively transmitting to either said roll or yaw mixing means the signal selected by said mode selector means, and roll and yaw actuator means respectively responsive to said roll and yaw mixing means for actuating said roll and yaw control surfaces respectively, *said roll mixing means being additionally responsive to the output of said yaw mixing means for providing compensation of adverse rolling moments induced by actuation of said yaw control surface.*

6. In combination with an aircraft having roll and yaw control surfaces, gyroscopic means for generating roll and yaw rate signals, heading deviation means for generating a heading control signal indicative of the difference between the heading of said aircraft and a selected heading reference signal, means for selectively varying said heading reference signal, means for generating a turn control signal, mode selector means for alternatively selecting said turn signal or said heading control signal, roll and yaw mixing means having inputs receiving said roll and yaw rate signals, turn mode selector means for alternatively transmitting to either said roll or yaw mixing means the signal selected by said selector means, and roll and yaw actuator means respectively responsive to said roll and yaw mixing means for actuating said roll and yaw control surfaces respectively, *said roll mixing means being additionally responsive to the output of said yaw mixing means for providing compensation of adverse rolling moments induced by actuation of said yaw control surface.*

[7. In combination with an aircraft having aerodynamic control surfaces, gyroscopic stabilizing means on said aircraft for generating position and rate signals indicative of orientation of said aircraft and rate of change thereof, flight condition means for generating control signals indicative of deviation of said aircraft from a predetermined flight condition, means for combining said position, rate and control signals, and actuator means responsive to said combined signals for operating said surfaces, said flight condition means comprising a flight condition sensing instrument, a follow-up servo having an input, summing means having inputs from said instrument and follow-up servo for providing an error output indicative of the algebraic sum of the inputs thereto, a multi-position switch for alternatively coupling and decoupling said error output to said follow-up servo input, said error output providing said control signals, and reference condition varying means comprising a source of potential and a switch operable to couple or decouple said follow-up servo input to either side of said source.]

8. In combination with an aircraft having a yaw control surface and a pair of pitch-roll control surfaces equally operable for pitch control and differentially operable for roll control, gyroscopic means for generating pitch, roll and yaw rate signals, flight parameter deviation means for generating a parameter error control signal indicative of the difference between the instantaneous value of a flight parameter and a selected reference signal, means for selectively varying said selected reference signal, means for generating a pitch control signal, mode selector means for selecting one of said control signals, pitch mixing means for algebraically combining said selected control signal with said pitch rate signals, pitch-roll actuator means responsive to said mixing means for equally operating said pitch-roll surfaces in unison, heading deviation means for generating a heading control signal indicative of the difference between the heading of said aircraft and a selected heading reference signal, means for selectively varying said heading reference signal, means for generating a turn control signal, lateral mode selector means for alternatively selecting said turn signal and said heading control signal, roll and yaw mixing means having inputs receiving said roll and yaw rate signals, turn mode selector means for alternatively transmitting to either said roll or yaw mixing means the signal selected by said lateral mode selector means, yaw actuator means responsive to said yaw mixing means for actuating said yaw control surfaces and means coupled with said roll mixing means for differentially transmitting the output of said roll mixing means to said pitch-roll actuator means, *said roll mixing means being additionally responsive to the output of said yaw mixing means for providing compensation of adverse rolling moments induced by actuation of said yaw control surface.*

9. Control apparatus for an aircraft having a yaw control surface and a pair of pitch-roll control surfaces equally operable for pitch control and differentially operable for roll control, said apparatus comprising gyroscopic means for generating stabilizing pitch, roll and yaw position and rate signals, indicated air speed deviation means for generating an air speed error control signal indicative of the difference between indicated air speed of said aircraft and a selected reference signal, Mach number deviation means for generating a Mach error control signal indicative of the difference between Mach number of said aircraft and a selected reference signal, altitude deviation means for generating an altitude error control signal indicative of the difference between altitude of said aircraft and a selected reference signal, means for selectively varying each of said selected reference signals, means for generating a pitch control signal, means for generating a landing flare control signal, means for generating a landing control signal, mode selector means for alternatively selecting one of said control signals, pitch mixing means for algebraically combining said selected control signal with said pitch rate and position signals, pitch-roll actuator means responsive to said mixing means for equally operating said pitch-roll surfaces in unison, heading deviation means for generating a first heading control signal indicative of the difference between the heading of said aircraft and a selected heading reference signal, means for selectively varying said heading reference signal, said heading deviation means including means for generating a second heading control signal indicative of the combination of selected heading deviation and a selected rate of change of heading deviation, means for generating a turn control signal, lateral mode selector means for alternatively selecting said turn signal, said first heading control signal or both said turn signal and said second heading control signal, roll and yaw mixing means having inputs receiving said roll and yaw position and rate signals, turn mode selector means for alternatively transmitting to either said roll or yaw mixing means the signal selected by said lateral mode selector means, yaw actuator means responsive to said yaw mixing means for actuating said yaw control surfaces and means coupled with said roll mixing means for differentially transmitting the output of said roll mixing means to said pitch-roll actuator means, *said roll mixing means being additionally responsive to the output of said yaw mixing means for providing compensation of adverse rolling moments induced by actuation of said yaw control surface.*

10. The apparatus of claim 9 wherein at least one of said deviation means comprises a flight condition sensing instrument, a follow-up servo having an input, summing means having inputs from said instrument and follow-up servo for providing an error output indicative of the algebraic sum of the inputs thereto, said mode selector means comprising a multi-position switch for alternatively coupling and decoupling said error output to said follow-up servo input, said error output providing the control signal generated by said one deviation means, said selected reference signal varying means comprising a source of potential and a switch operable to couple or decouple said follow-up servo input to either side of said source.

11. Control apparatus for an aircraft having roll and yaw control surfaces, comprising means for generating turn control signals, a roll amplifier, a yaw amplifier, means for generating and respectively feeding roll and yaw rate signals to said amplifiers, switch means for alternatively feeding said turn control signals to said roll amplifier or said yaw amplifier, and means responsive to said amplifiers for respectively actuating said roll and yaw control surfaces, *an input of said roll amplifier being further responsive to the output of said yaw amplifier for providing compensation of adverse rolling moments induced by actuation of said yaw control surface.*

12. Control apparatus for an aircraft having landing gear and roll and yaw and pitch control surfaces, comprising means for generating turn control signals, a roll amplifier, a yaw amplifier, means for generating and respectively feeding roll and yaw rate signals to said amplifier, switch means for alternatively feeding said turn control signals to said roll amplifier or said yaw amplifier, means actuated by said landing gear for operating said switch to feed said control signals to said yaw amplifier while the aircraft is on the ground and to said roll amplifier while the aircraft is in flight, means responsive to said amplifiers for respectively actuating said roll and yaw control surfaces, a pitch amplifier, means responsive to said pitch amplifier for actuating said pitch surface, means responsive to said landing gear for feeding a pitch-down signal to said pitch amplifier to effect downward pitching of said aircraft upon landing, and means for disabling said last-mentioned means during take-off.

[13. A system for operating a control mechanism of an aircraft to control the aircraft in accordance with a selected flight condition comprising a flight instrument for generating a condition signal indicative of said flight condition, a storage device for storing a signal indicative of the instantaneous input thereto, an algebraic summing device connected to receive said condition signal and said stored signal and provide an output indicative of the algebraic sum thereof, an actuator for operating said control mechanism, switch means for alternatively coupling said output of said summing device to said storage device as an input thereto or to said actuator, and selectively operable reference value control means providing an additional input to said storage device for selectively varying the value of the signal stored therein.]

[14. A system for operating a pitch control surface of an aircraft to control the attitude of the aircraft about the pitch axis thereof in accordance with a selected value of a selected flight condition comprising first and second flight instruments for generating condition signals indicative of first and second flight conditions respectively, first and second storage means for respectively storing first and second signals indicative of the instantaneous inputs thereto, first and second algebraic summing devices, said first device connected to receive said first condition signal and said first stored signal and provide an output indicative of the algebraic sum of the inputs thereto, said second device connected to receive said second condition signal and said second stored signal and provide an output indicative of the algebraic sum of the input thereto, an actuator for operating said control surface, first switch means for alternatively coupling said output of said first summing device to said first storage means or to said actuator, second switch means for alternatively coupling said output of said second summing device to said second storage means or to said actuator, a source of potential, and a selectively operable switch for coupling either side of said source to said storage means as an additional input thereto for selectively varying the value of the signal stored therein.]

[15. A system for operating a control mechanism of an aircraft to control a flight condition of an aircraft in accordance with a selected value of said condition comprising a flight instrument for generating a condition signal indicative of the instantaneous value of said flight condition of said aircraft, a storage device for storing the value of the inputs thereto, a summing device for algebraically combining said condition signal with said stored signal, means responsive to the output of said summing device for operating said control mechanism, switch means for alternatively coupling said summing device output to said storage device input or to said mechanism operating means, and means for providing a selectively variable input to said storage device, whereby said storage device will store the value of said condition signal at the instant of switching of said summing device output and said condition signal may be compared with said stored value or a controlled variation thereof.]

[16. Control apparatus for an aircraft having a pitch control surface, comprising a pitch command servo including a modulator for receiving at an input thereof a D.C. pitch command signal and providing at an output thereof an A.C. command signal in accordance with said D.C. signal, a servo amplifier having an input connected with said modulator output and having an output, a motor connected to be driven by said amplifier output, a potentiometer connected to be driven by said motor, and a feedback connection from said potentiometer to said modulator input; a load limiter servo having an input connected with said potentiometer and having a second input and an output; a synchro control transformer having a first input connected with said load limiter servo output and having a second input and an output; a pitch angle gyro having an output connected with said synchro control transformer second input; a pitch control surface actuator servo having an input connected with said synchro control transformer output; a flight condition reference servo comprising a flight instrument, a second synchro control transformer having an input connected with said instrument and having a second input and an output, an instrument amplifier having an output and first and second inputs, a second motor connected to be driven by said instrument amplifier output, a synchro generator connected to be driven by said second motor, a connection between said synchro generator and said second input of said second synchro control transformer, a reference servo output terminal, and a switch alternatively connecting said second synchro control transformer output to said output terminal or to said instrument amplifier first input; a source of potential having first and second outputs of mutually opposite phase; a second switch for alternatively coupling said instrument amplifier second input to said first or second source outputs; and a connection between said reference servo output terminal and said load limiter servo second input.]

[17. Control mechanism for an aircraft having a pitch control surface, comprising a source of pitch command signal, an actuator for operating said control surface, capacitative means for coupling said source to said actuator, instrument servo means for generating an error signal indicative of the deviation of an aircraft flight condition from a selected value thereof, switch means selectively operable to couple or decouple said servo means to and from said actuator, a second switch connected across said capacitative coupling means, and means for operating said switches together so as to shunt said capacitative coupling means when said servo means is decoupled from said actuator and to open said second switch when said servo means is coupled to said actuator.]

[18. Apparatus for operating the control mechanism of an aircraft, comprising an actuator for operating said mechanism, a first source of control signal, a second source of control signal, first means for selectively coupling and decoupling said first source to said actuator, second means for selectively decoupling and coupling said second source to said actuator, selector means for operating said first and second coupling means together so that said second source is decoupled from said actuator while said first source is coupled thereto, and means for temporarily transmitting a signal from said second source to said actuator so that said signal from said second source will be momentarily coupled to said actuator while a signal from said first source is coupled to said actuator.]

[19. A system for operating a control mechanism on aircraft to control a flight condition of an aircraft comprising a flight instrument for generating a condition signal indicative of the instantaneous value of said flight condition of said aircraft, a storage device for storing the value of the input thereto, a summing device for algebraically combining said condition signal with said stored signal, means for operating said control mechanism, switch means for alternatively coupling said summing device output to said storage device input or to said mechanism operating means, a source of control signal, a capacitor coupled between said control signal source and said mechanism operating means, switch means connected in shunt across said capacitor, and means for simultaneously operating both said switch means so as to disable the shunting of said capacitor when said summing device output is coupled to said mechanism operating means.]

[20. A system for operating a control mechanism of an aircraft to control heading of the aircraft comprising a directional gyro for generating a condition signal indicative of the instantaneous value of heading of said aircraft, a servo having an input and an output, a summing device for algebraically combining said condition signal with said servo output, means for alternatively coupling relatively large or relatively small fractions of said summing device output to said servo input, a source of control signal, and means responsive to both said control signal source and said summing device for operating said control mechanism.]

References Cited by the Examiner

The following references, cited by the Examiner, are of record in the patented file of this patent or the original patent.

UNITED STATES PATENTS

| | | | |
|---|---|---|---|
| 2,429,642 | 10/1947 | Newton | 244—77 |
| 2,471,821 | 5/1949 | Kutzler et al. | 244—77 |
| 2,553,560 | 5/1951 | Esval | 244—77 |
| 2,568,719 | 9/1951 | Curry | 244—77 |
| 2,612,331 | 9/1952 | Frazier et al. | 244—77 |
| 2,630,282 | 3/1953 | Halpert | 244—77 |
| 2,662,704 | 12/1953 | Huntington | 244—77 |
| 2,723,089 | 11/1955 | Schuck et al. | 244—77 |
| 2,733,878 | 2/1956 | Ciscel | 244—77 |
| 2,769,601 | 11/1956 | Hagopian et al. | 244—77 |
| 2,786,973 | 3/1957 | Kutzler | 318—44 X |
| 2,833,970 | 5/1958 | Cummings | 244—77 X |
| 2,862,167 | 11/1958 | Curry | 244—77 |
| 2,869,063 | 1/1959 | Hess | 244—77 |
| 2,896,883 | 7/1959 | Andeen | 244—77 |

FOREIGN PATENTS

| | | |
|---|---|---|
| 1,162,426 | 4/1958 | France. |

FERGUS S. MIDDLETON, *Primary Examiner.*